United States Patent [19]

Fujii et al.

[11] Patent Number: 4,975,390

[45] Date of Patent: Dec. 4, 1990

[54] METHOD OF FABRICATING A SEMICONDUCTOR PRESSURE SENSOR

[75] Inventors: Tetsuo Fujii, Toyohashi; Susumu Kuroyanagi, Anjo; Akira Kuroyanagi, Okazaki; Tomohiro Funahashi, Kasugai; Minekazu Sakai, Aichi; Shinji Yoshihara, Anjo, all of Japan

[73] Assignee: Nippondenso Co. Ltd., Kariya, Japan

[21] Appl. No.: 132,573

[22] Filed: Dec. 8, 1987

[30] Foreign Application Priority Data

| Dec. 18, 1986 | [JP] | Japan | 61-302299 |
| Dec. 19, 1986 | [JP] | Japan | 61-305039 |
| Mar. 25, 1987 | [JP] | Japan | 62-72076 |
| Mar. 25, 1987 | [JP] | Japan | 62-72078 |
| Jun. 12, 1987 | [JP] | Japan | 62-147513 |
| Aug. 5, 1987 | [JP] | Japan | 62-195665 |

[51] Int. Cl.$^5$ ............................................. H01L 21/306
[52] U.S. Cl. ..................................... 437/228; 437/225; 437/901; 148/DIG. 135; 148/DIG. 12; 357/56; 156/657
[58] Field of Search ............... 437/228, 225, 901, 238, 437/235; 148/DIG. 135, DIG. 12; 357/26; 156/653, 657

[56] References Cited

U.S. PATENT DOCUMENTS

| 3,757,414 | 9/1973 | Keller | 437/901 |
| 3,922,705 | 11/1975 | Yerman | 437/901 |
| 4,103,273 | 7/1978 | Keller | 437/901 |
| 4,121,334 | 10/1978 | Wallis | 437/901 |
| 4,234,361 | 11/1980 | Gackel | 437/228 |
| 4,463,336 | 7/1984 | Black | 357/26 |
| 4,510,671 | 4/1985 | Kurtz | 437/24 |
| 4,784,721 | 11/1988 | Holmen | 357/26 |

FOREIGN PATENT DOCUMENTS

| 0051490 | 4/1979 | Japan | 357/26 |
| 0103684 | 8/1979 | Japan | 357/26 |
| 0127690 | 10/1979 | Japan | 357/26 |
| 0141588 | 11/1979 | Japan | 357/26 |
| 0239675 | 10/1986 | Japan | 357/26 |
| 2183906 | 6/1987 | United Kingdom | 357/26 |

Primary Examiner—Brian E. Hearn
Assistant Examiner—Kevin McAndrews
Attorney, Agent, or Firm—Cushman, Darby & Cushman

[57] ABSTRACT

Herein disclosed is a semiconductor pressure sensor and a method of manufacture. The sensor includes a plate having a recess in its main surface. A diaphragm has a lower surface therof bonded to a first main surface of the plate and formed so as to have an upper surface having no holes therein. A piezoresistive layer is formed so as to be in contact with the diaphragm and is positioned so as to be at least partially over the recess. The resistance of the piezoresistive layer provides an indication of pressure applied to the diaphragm. The manufacturing method includes forming a piezoresistive layer of a single crystal substrate in a diaphragm without any recrystallization.

14 Claims, 23 Drawing Sheets

F I G. 5
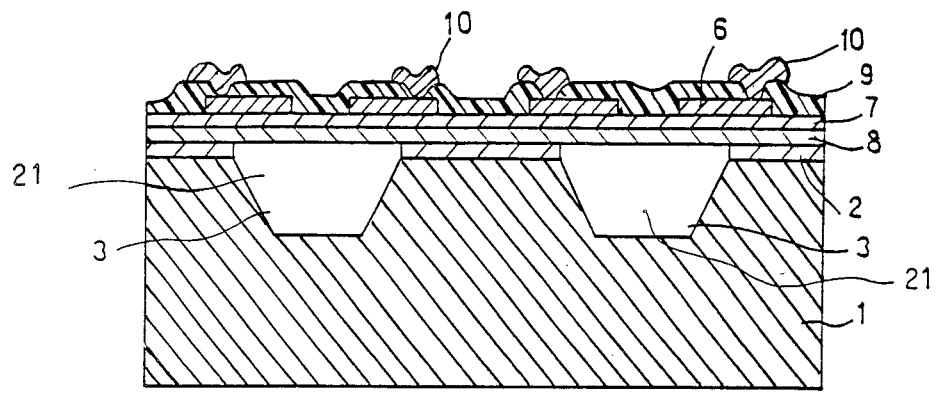

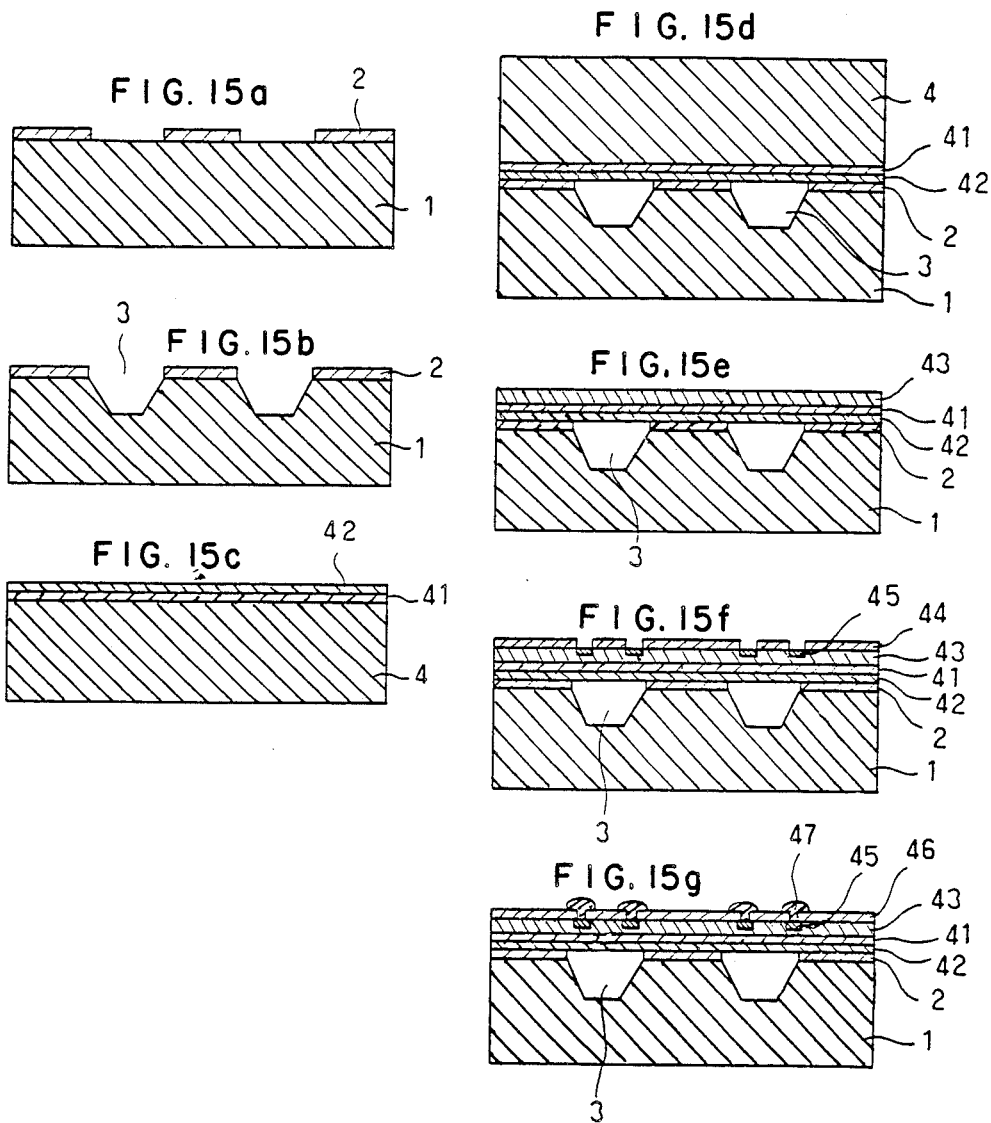

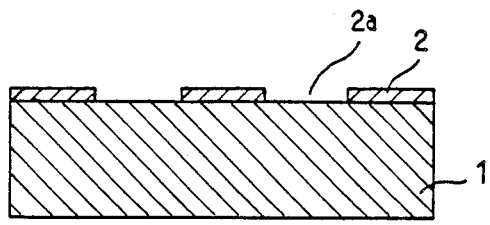
F I G. 17a
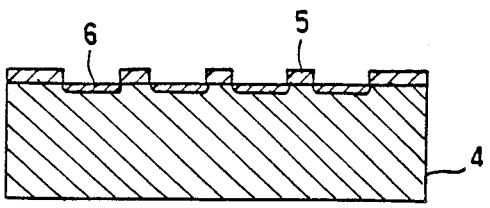
F I G 17b
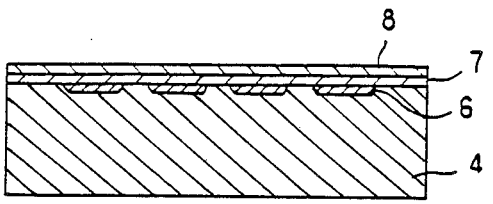
F I G. 17c
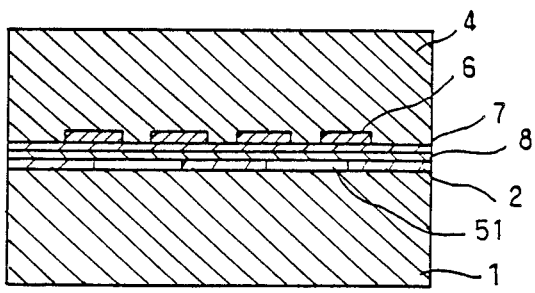
F I G.17d
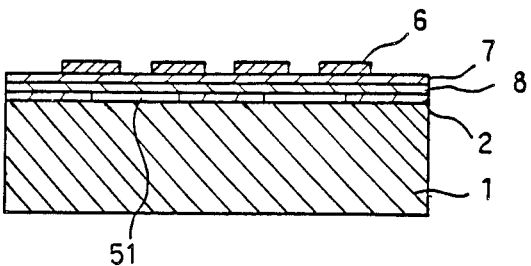
F I G. 17e

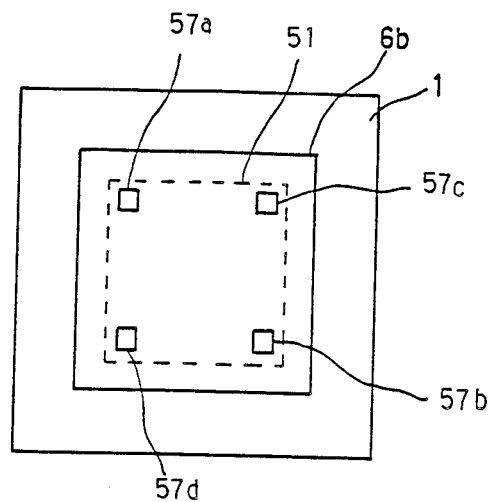
F I G. 19e

4,975,390

METHOD OF FABRICATING A SEMICONDUCTOR PRESSURE SENSOR

BACKGROUND OF THE INVENTION

The present invention relates to a semiconductor pressure sensor making use of the piezoresistive effect and a method of fabricating the same.

By making use of the fact that a resistance is varied due to the piezoresistive effect by applying a mechanical stress, there is used a semiconductor pressure sensor for detecting the change in the resistance due to piezoresistive effect to measure the pressure by thinning a portion of a single crystal silicon substrate to form a diaphragm, by forming a strain gauge of a diffusion layer in an epitaxial layer formed in the diaphragm and by deforming the strain gauge under pressure.

The manuscripts of the 6th "THE BASIC AND APPLICATION OF SENSOR" symposium, P 27-28, entitled "Micro-Diaphragm Pressure Sensor" disclose a semiconductor pressure sensor which will be described with reference to FIG. 20. That device includes a substrate 100 having a crystal plane (100), which has an etched recess or cavity 100a. A silicon oxide film 101 is formed in a predetermined region over the main surface of substrate 100 A polycrystalline silicon layer 102 is formed in a predetermined region in the portion, which is not formed with the silicon oxide film 101 (but is formed with the cavity 100a), and over the silicon oxide film around that portion and which is removed by etching. A first silicon nitride film 103 is formed over the polycrystalline silicon layer 102 and the silicon oxide film 101 and has an etch-hole 106 therein. Over this first silicon nitride film 103, there are formed a strain gauge 104 made of polycrystalline silicon of a predetermined pattern and a second silicon nitride film 105. An undercut-etching is accomplished through the etch-hole 106 to form the cavity 100a in a desired position by making use of the relatively high etching rate of the polycrystalline silicon. The silicon nitride film overlying the cavity 100a is used as a diaphragm. Finally, the pressure sensor is constructed by sealing the etch-hole 105 with a third silicon nitride film 107 which is formed by the CVD (i.e., Chemical Vapor Deposition).

In the semiconductor pressure sensor thus constructed, the single crystal silicon substrate 100 is etched from its surface at the side to be formed with the stain gauge 104, to form the cavity 100a and use the silicon nitride film thereover as the diaphragm. This makes it possible to reduce the volume of the single crystal silicon substrate 100 to a relatively small value and to thin the diaphragm thereby to reduce its size. Since, however, the strain gauge 104 is made of the polycrystalline silicon, the semiconductor pressure sensor has a lower sensitivity than that made of single crystal silicon so that its characteristics are not very uniform. In this connection, there has been proposed a technique in which a single crystal strain gauge is formed by recrystallizing the polycrystalline silicon. According to this technique, however, it is difficult to make the characteristic more uniform, and the recrystallization raises the production cost.

Since, moreover, the diaphragm is not smooth in the portion in which the etch-hole 103 is formed, that portion is weak against a mechanical strain. When the etch-hole 106 is to be sealed with the third silicon nitride film 107, on the other hand, the dispersions are liable to cause the third silicon nitride film 107 to bury the etch-hole 106 so that the pressure sensor's output characteristics are unstable.

SUMMARY OF THE INVENTION

An object of the present invention is to provide a small-sized semiconductor pressure sensor having a smooth diaphragm and stable output characteristics.

Another object of the present invention is to provide a method of fabricating a piezoresistive layer of a single crystal semiconductor into the diaphragm without any recrystallization.

In accordance with a first aspect of the present invention, there is provided a semi-conductor pressure sensor including: a plate having a recess in a first main surface thereof; a diaphragm having a lower surface bonded to the first main surface of the plate and formed so as to have an upper surface having no holes therein; and a piezoresistive layer formed so as to contact with the diaphragm and positioned so as to be at least partially over the recess, the resistance of the piezoresistive layer providing an indication of pressure applied to the diaphragm.

In accordance with a second aspect of the present invention, there is provided a semiconductor pressure sensor including: a substrate having a main surface; an intermediate layer formed on the main surface of the substrate and having an aperture in a predetermined region thereof; and a piezoresistive layer having a lower surface in contact with the intermediate layer and positioned so as to be at least partially over the aperture and having an upper surface with no holes therein, the piezoresistive layer formed to act as a diaphragm of the sensor, the resistance of the piezoresistive layer providing an indication of pressure applied thereto.

In accordance with a third aspect of the present invention, there is provided a method of fabricating a semiconductor pressure sensor including the steps of: forming a recess in a first substrate; doping with an impurity from a main surface of a second substrate of a semiconductor to form a piezoresistive layer in a predetermined region of the second substrate; forming a diaphragm layer on the main surface of the second substrate; bonding the first substrate with the diaphragm layer so that the piezoresistive layer is positioned at least partially over the recess; and etching away a portion of the second substrate to leave at least the diaphragm layer to act as a diaphragm of the sensor, along with the piezoresistive layer.

In accordance with a fourth aspect of the present invention, there is provided a method of fabricating a semiconductor pressure sensor including the steps of: forming a recess in a main surface of a first substrate; forming a diaphragm layer having a piezoresistive layer in a predetermined region thereof on a main surface of a second substrate of a semiconductor; bonding the main surface of the first substrate with the diaphragm layer, so that the piezoresistive layer is positioned at least partially over the recess; and etching away the second substrate to leave the diaphragm layer having a piezoresistive layer to act as a diaphragm of the sensor.

In accordance with a fifth aspect of the present invention, there is provided a method of fabricating a semiconductor pressure sensor including the steps of: forming a recess in a main surface of a first substrate; forming a diaphragm layer on a main surface of a second substrate of a semiconductor; bonding the main surface of the first substrate with the diaphragm layer; etching away at least a portion of the second substrate to leave a diaphragm having at least the diaphragm layer; and the step of forming a piezoresistive layer so as to contact with the diaphragm and positioned so as to be at least partially over the recess.

In accordance with a sixth aspect of the present invention, there is provided a method of fabricating a semiconductor pressure sensor including the steps of: forming a recess in a main surface of a first substrate; forming a diaphragm layer on a main surface of a second substrate; forming a piezoresistive layer on a predetermined region of the diaphragm layer; bonding the main surface of the first substrate with the diaphragm layer, so that the piezoresistive layer enters within the recess; and etching away the second substrate to leave the diaphragm layer to act as a diaphragm of the sensor, along with the piezoresistive layer.

In accordance with a seventh aspect of the present invention, there is provided a method of fabricating a semiconductor pressure sensor including the steps of: providing a first substrate; providing a second substrate of a semiconductor; doping with an impurity from a main surface of the second substrate to form a piezoresistive layer in a predetermined region of the second substrate; forming a diaphragm layer on the main surface of the second substrate; bonding the first substrate with the diaphragm layer through an intermediate layer extending therebetween and having an aperture therein corresponding to the piezoresistive layer; and etching away a portion of the second substrate to leave at least the diaphragm layer to act as a diaphragm of the sensor, along with the piezoresistive layer.

In accordance with a eighth aspect of the present invention, there is provided a method of fabricating a semiconductor pressure sensor including the steps of: providing a first substrate; providing a second substrate of a semiconductor; bonding the first substrate with the second substrate through an intermediate layer extending therebetween and having an aperture therein; etching away a predetermined thickness of the second substrate to leave a predetermined thickness thereof to act as a diaphragm of the sensor; and forming a piezoresistive layer so as to contact with the second substrate and positioned so as to be at least partially over the aperture.

In accordance with a ninth aspect of the present invention, there is provided a method of fabricating a semiconductor pressure sensor including the steps of: providing a first substrate; providing a second substrate of a semiconductor; doping with an impurity from a main surface of the second substrate to form a piezoresistive layer in a predetermined region of the second substrate; bonding the first substrate with the main surface of the second substrate through an intermediate layer extending therebetween and having an aperture therein corresponding to the piezoresistive layer; and etching away a portion of the second substrate to leave the piezoresistive layer to act as a diaphragm of the sensor.

BRIEF DESCRIPTION OF THE DRAWINGS

FIG. 5 is a sectional view for explaining a fourth modification of the first embodiment of the present invention;

FIGS. 15(a) to 15(g) are sectional views for explaining a semiconductor pressure sensor according to an eighth embodiment of the present invention;

FIGS. 17(a) to 17(f) are sectional views for explaining a semiconductor pressure sensor according to a tenth embodiment of the present invention;

FIG. 19(e) is a top plan view showing the semiconductor pressure sensor according to the twelfth embodiment of the present invention.

DETAILED DESCRIPTION OF THE PREFERRED EMBODIMENTS

[First Embodiment]

A semiconductor pressure sensor according to a first embodiment of the present invention will be described in the order of its fabrication steps with reference to FIGS. 1(a) to 1(g).

Figure 1A:
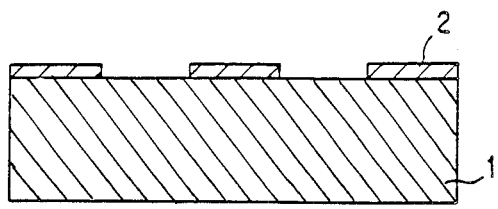
FIGS. 1(a) to 1(g) are sectional views for explaining a semiconductor pressure sensor according to a first embodiment of the present invention.
Figure 1B:
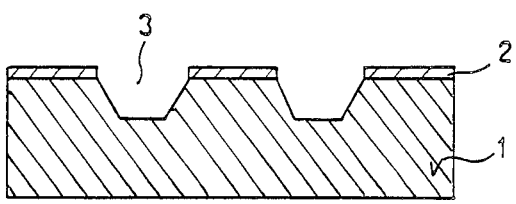

In FIG. 1(a), reference numeral 1 denotes a first single crystal silicon substrate having a crystal plane (100). A silicon oxide ($SiO_2$) film 2 is formed in a predetermined region on the main surface of the first single crystal silicon substrate 1. Using this silicon oxide film 2 as a mask, the first single crystal silicon substrate 1 is etched with an anisotropic etching liquid (or etchant)

such as potassium hydroxide (KOH) to form a recess 3, as shown in FIG. 1(b). As an alternative, the substrate may have a crystal plane of (110) and may be recessed pyrex glass or sapphire.

Figure 1C:
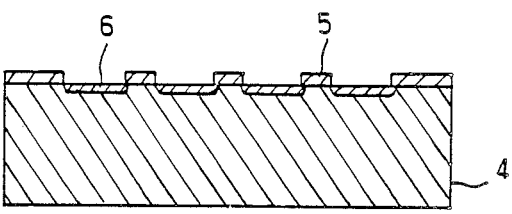
Figure 1D:
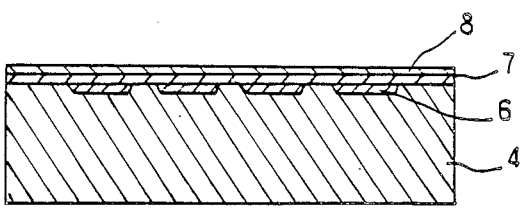

As shown in FIG. 1(c), on the other hand, a second single crystal silicon substrate 4 of N-conductivity type having a specific resistance of 3 to 5 Ω/cm and a crystal plane of (100) or (110), for example, is formed with a silicon oxide film 5 in a predetermined region on its main surface. This silicon oxide film 5 is used as a mask to diffuse a P-type impurity such as boron (B) with a high dose thereby to form a piezoresistive layer 6 in a direction of <110>. Subsequently, the silicon oxide film 5 is removed. After this, as shown in FIG. 1(d), the second single crystal silicon substrate 4 is formed all over its main surface by the LPCVD or plasma CVD method with a silicon nitride ($Si_3N_4$) film 7 having a thickness of 0.1 to 2.0 μm, which is covered with a BPSG film 8. At this time, the BPSG film 8 has a generally smooth surface. Moreover, either the steps of FIGS. 1(a) and 1(b) or the steps of FIGS. 1(c) and 1(d) may be carried out first, or both may be accomplished concurrently.

Figure 1E:
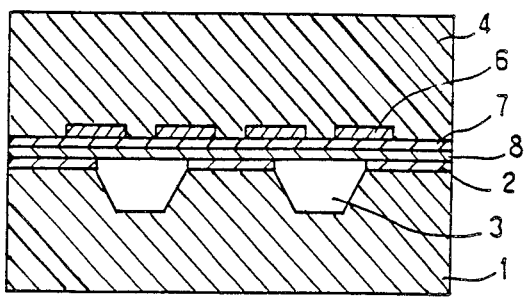

Then, as shown in FIG. 1(e), the BPSG film 8 formed over the second single crystal silicon substrate 4 is so arranged on the main surface of the first single crystal silicon substrate 1 by alignment using an infrared microscope, for example, that the upper and lower patterns may be overlapped, as preset. Here, in the present embodiment, the first and second single crystal silicon substrates 1 and 4 (or their wafers) have their peripheries temporarily bonded by welding them in vacuum with a laser beam. After this, sintering is accomplished in a vacuum furnace at about 1,000° C. to melt the BPSG film 8 to weld the first and second single crystal silicon substrates 1 and 4. Since, in this instance, the welding is accomplished in vacuum, the recess 3 is evacuated to provide a reference pressure chamber. In order to complete the welding, the substrate is weighted. Incidentally, the bonding of the first and second single crystal silicon substrates 1 and 4 can be accomplished by the following methods in addition to the above-specified method:

(1) using glass of a lower melting point in place of the BPSG film 8,
(2) using "anodic bonding" to bond the first substrate with the BPSG film (in this case the silicon oxide film 2 is first removed from single crystal silicon substrate 1),
(3) direct bonding in vacuum and in a hot furnace without any temporary bonding, and
(4) forming the bonding BPSG film 8 not on the whole surface of the silicon nitride film 7 but partially at the portions to be bonded.

Incidentally, the silicon nitride film 7 acting as an insulating film may be another insulating film such as a silicon oxide film.

Figure 1F:
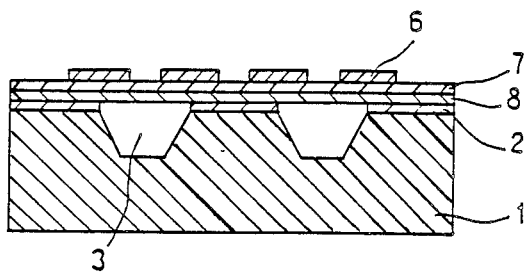
Figure 1G:
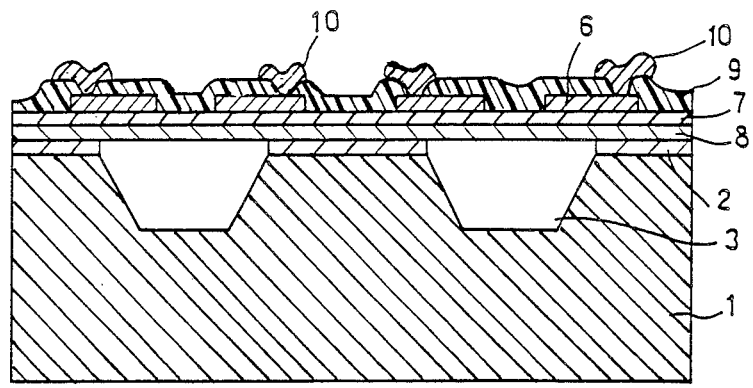

Next, as shown in FIG. 1(f), the other main surface (or back face) of the first single silicon substrate 1 is covered with wax (although not shown), and the second single crystal silicon substrate 4 is etched away from its other main surface (or back face) with an anisotropic etching liquid which is composed mainly of ethylenediamine (260 ml), pyrocatechol (45 g) and water (120 ml), for example. In this instance, the etching proceeds selectively into the regions of N-conductivity type to leave most portions of the piezoresistive layer 6 and the silicon nitride film 7, which are highly doped with the boron. Thus, the single crystal piezoresistive layer 6 is formed over the silicon nitride film 7 acting as an insulating film. As shown in FIG. 1(g), moreover, a surface protecting film 9 and a wiring layer 10 made of aluminum or the like are formed to construct the semiconductor pressure sensor of the present embodiment.

In this embodiment, the plate is composed of the first single silicon substrate and the silicon oxide film 2, and the diaphragm is composed of the silicon nitride film 7 and the BPSG film 8. Therefore, the piezoresistive layer 6 can be electrically completely isolated from the first single crystal silicon substrate 1 by the silicon nitride film 7 and so on so that the semiconductor pressure sensor of the present embodiment can have stable characteristics even if it is used at a high temperature. In the present embodiment, moreover, the single crystal piezoresistive layer 6 is formed over the silicon nitride film 7 so that the sensitive can be increased with less dispersion than those of a polycrystalline piezoresistive layer. The semiconductor pressure sensor according to the present embodiment is effective in that the dispersion of the characteristics can be made smaller to drop the fabrication cost than that of the structure in which the polycrystalline silicon is recrystallized to form a piezoresistive layer.

The main surface of the first single crystal silicon substrate 1 at the side of the piezoresistive layer 6 is formed with the recess 3, and the volume to be etched to form the recess is relatively small so that the first single crystal silicon substrate 1 can be accordingly effectively used. The semiconductor pressure sensor can be small-sized as a whole in case a circuit for processing the signal from the semiconductor pressure sensor is formed in the first single crystal silicon substrate 1. In this embodiment, moreover, the diaphragm composed of the silicon nitride film 7 and the BPSG film 8 is made generally smooth over the recess 3 and all over the first single crystal silicon substrate 1 around the recess 3 but is not formed with any etch-hole, as different from the structure of the prior art, so that the semiconductor pressure sensor of the present embodiment can be accordingly strong against the mechanical stress and stable in the output characteristics.

Figure 2:
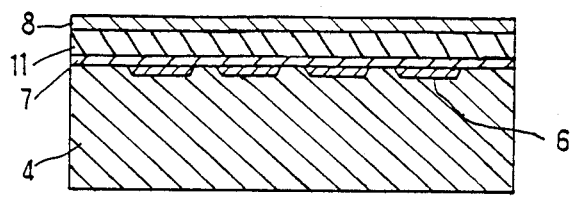
FIG. 2 is a sectional view for explaining a first modification of the first embodiment of the present invention.

Next, a first modification (alternative embodiment) of the first embodiment will be described with reference to FIG. 2. The thickness of the diaphragm of the embodiment shown in FIG. 1 is adjusted depending upon the thickness of the silicon nitride film 7. As shown in FIG. 2, however, the second single crystal silicon substrate 4 before the bonding may be constructed by forming a polycrystalline silicon layer 11 or a recrystallized single crystal silicon layer having a suitable coefficient of thermal expansion on the silicon nitride film 7 and by forming the BPSG film 8 on the polycrystalline silicon layer 11, so that the thickness of the diaphragm may be arbitrarily adjusted depending upon the thickness of that polycrystalline silicon layer 11. Incidentally, in this case, the diaphragm is composed of the silicon nitride film 7, the BPSG film 8 and the polycrystalline silicon layer 11.

Figure 3:
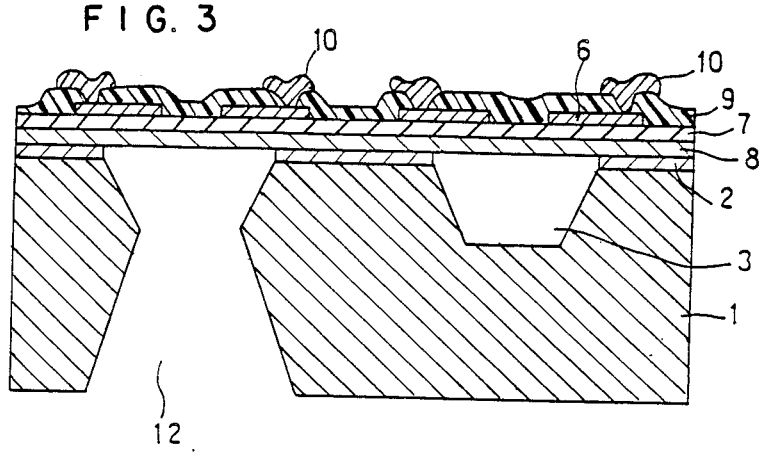
FIG. 3 is a sectional view for explaining a second modification of the first embodiment of the present invention.

A second modification of the first embodiment is shown in FIG. 3. Although the embodiment shown in FIG. 1 is constructed as an absolute pressure sensor, the first single crystal silicon substrate 1 may be opened in advance to form a vent hole 12, as shown in FIG. 3, so that the semiconductor pressure sensor may be used as a relative pressure sensor.

Figure 4:
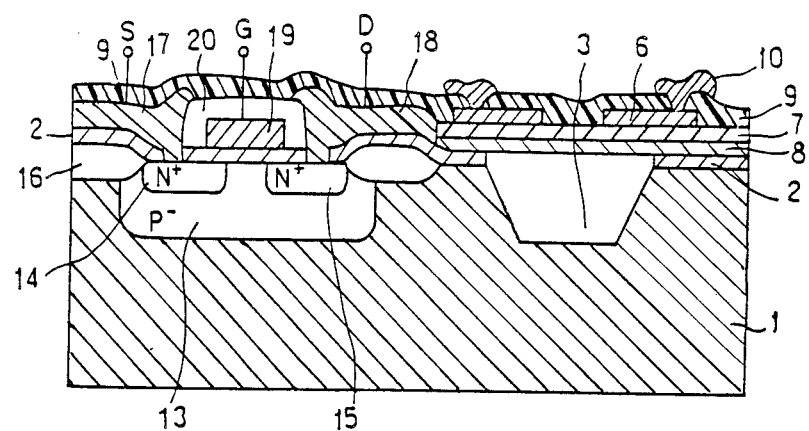
FIG. 4 is a sectional view for explaining a third modification of the first embodiment of the present invention.

A third modification of the first embodiment in shown in FIG. 4. According to this modification, a circuit for processing the output of the semiconductor pressure sensor is formed in the first single crystal silicon substrate 1. FIG. 4 shows a MOSFET, for example, as a structural component of the output processing circuit. A P$^-$ well region 13 is formed in the first single crystal silicon substrate 1. An N$^+$ source 14 and drain diffusion 15 regions are formed in the P-type well region 13, respectively. Reference numeral 16 denotes a field insulating film; numerals 17 and 18 source and drain electrodes, respectively; numeral 19 a gate electrode; and numeral 20 an insulating film, all of which are formed by the known semiconductor processing techniques.

Figure 6:
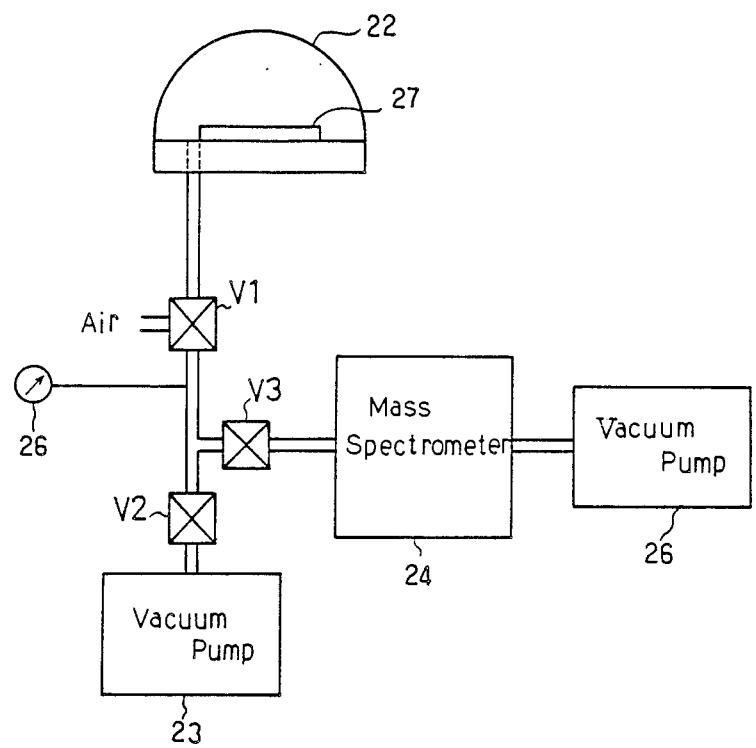
FIG. 6 is a schematic block diagram showing a helium leak detector.

A fourth modification of the first embodiment is shown in FIG. 5. In the embodiment shown in FIG. 1, the bonding of the first and second single crystal silicon substrates 1 and 4 is accomplished by temporarily welding the peripheries of the two substrates 1 and 4 in the atmosphere of helium gases under a predetermined pressure with a laser beam and subsequently by heating them in the atmosphere of the helium gases under a predetermined pressure at about 1,000° C. to melt the BPSG film 8 thereby bonding the first and second single crystal silicon substrates 1 and 4. Then, the helium gases under a predetermined pressure are confined in the recess 3 acting as the reference pressure chamber, as shown in FIG. 5. According to the modification of FIG. 5, the helium gases are confined in the wafer state, and the bonding is carried out in the hot atmosphere of helium gases of 300° to 1,200° C. so that water vapors or other gases can be effectively discharged to provide excellently stabilized characteristics. Moreover, the semiconductor pressure sensor can be mass-produced with an identical accuracy and a low cost. Since the helium gases are confined in the recess 3, the gas-tightness of the recess 3 can be tested by a device (or a helium leak detector) shown in FIG. 6. In this device, a vacuum pump 23 is piped to a chamber 22 through a first valve (e.g., a three-way valve) V1 and a second valve V2, a mass spectrometer 24 is piped through a third valve V3 from between the first and second valves V1 and V2. Another vacuum pump 25 is piped through the mass spectrometer 24. Moreover, the first valve V1 has its one side vented to the atmosphere, and the three valves V1, V2 and V3 are equipped with a pressure gauge 26 in the course of their piping.

For the tests, a wafer 27 of the semiconductor pressure sensor fabricated, as described hereinbefore, is placed in the chamber 22. At this time, the first valve V1 is switched to the atmosphere side, and the third valve V3 is closed. After the wafer 27 has been placed, the first valve V1 is switched to the vacuum side, and the second valve V2 is opened to drop the chamber 22 at a predetermined pressure by the vacuum pump 23, followed by closing the second valve V2.

From the state in which the piping space between the third valve V3 and the vacuum pump 25 is set at a pressure equal to or lower than that in the chamber 22 by the vacuum pump 25, on the other hand, the third valve V3 is opened to introduce the gases in the chamber 22 into the mass spectrometer 24.

If, at this time, no helium is detected by the mass spectrometer 24, it is judged that the gas-tightness of the reference pressure chamber of the wafer 27 is held so that the wafer 27 is good. If any helium is detected, on the contrary, it is determined that a reference pressure chambers of a chip of wafer 27 is not pressure tight and the wafer 27 is judged to be no good.

After this, the third valve V3 is closed whereas the first valve V1 is switched to the atmospheric side, and the wafer 27 is then taken out from the chamber 22. If it is desired to determine which chip of the wafer 27 is defective after the result of the aforementioned test is "bad", the bad wafer in half re-tested as often as necessary to isolate the bad portion of the chip.

Thus, the gas-tightness of the reference pressure chamber can be tested simply on-line by the helium leak detector so that it can be warranted. Incidentally, the gases to be confined in the recess 3 are not to be limited to helium but may be any inert gas such as argon, for example, which will not adversely affect the individual semiconductor materials.

Several modifications of the first embodiment have been described hereinbefore with reference to the accompanying drawings, and the pattern of the piezoresistive layer 6 is formed in advance in the first embodiment. However, a predetermined pattern may also be formed after a P-type impurity of a predetermined thickness is diffused all over from the main surface in the second single crystal silicon substrate 4 and after the second single crystal silicon substrate 4 is etched. Moreover, the etching of the second single crystal silicon substrate 4 need not use the anisotropic etching liquid (which will be shortly referred to as the "E.P.W. liquid"), and which is composed in advance mainly of ethylenediamine, pyrocatechol and water. In an alternative, for example, an etching liquid such as potassium hydroxide (KOH) having a higher etching rate than that of the anisotropic etching liquid may be used to etch the substrate to a predetermined thickness, or this substrate may be lapped to the predetermined thickness, and the substrate is then etched in the E.P.W. liquid to leave the piezoresistive layer 6.

[Second Embodiment]

Figure 7A:
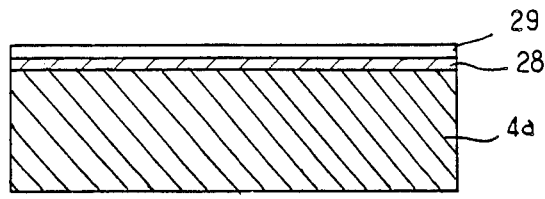
FIGS. 7(a) to 7(c) are sectional views for explaining a semiconductor pressure sensor according to a second embodiment of the present invention.
Figure 7B:
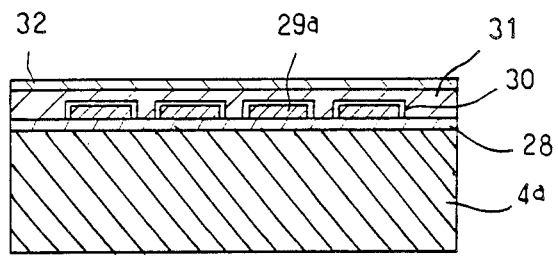

A semiconductor pressure sensor according to a second embodiment of the present invention will be described in the following with reference to FIGS. 7(a) to 7(c). Drawings for this embodiment corresponding to Figures 1a and 1b of the first embodiment are omitted because the initial steps of this embodiment are the same as those of the first embodiment shown in FIGS. 1a and 1b. Reference numeral 4a denotes a second single crystal silicon substrate. A silicon oxide film 28 is formed over the main surface of second substrate 4a. A so-called "SOI layer" 29 is formed by recrystallizing the polycrystalline silicon layer formed over the silicon oxide film 28. As better seen from FIG. 7(b), a piezoresistive layer 29a is formed by doping a predetermined region in that SOI layer 29, and the SOI layer except for the piezoresistive layer 29a is etched away to form a predetermined pattern. Moreover, a silicon oxide film 30 having a thickness of 1,000 to 2,000 Å is formed around the piezoresistive layer 29a by the thermal oxidization. A plasma nitride film 31 having a thickness of 1 to 2 μm and a generally smooth surface is formed over the silicon oxide film 30 and the silicon oxide film 28 by the etch-back method. Subsequently, a BPSG film 32 is formed over the plasma nitride film 31.

Figure 7C:
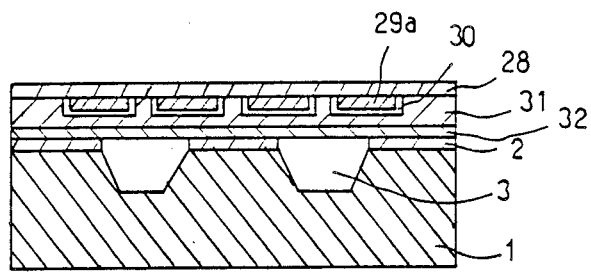

As shown in FIG. 7(c), moreover, the second single crystal silicon substrate 4a is bonded likewise to the first single crystal silicon substrate 1 which is formed as in the foregoing first embodiment, and is etched away up to the silicon oxide film 28, thus constructing a major portion of the semiconductor pressure sensor. The diaphragm in the present embodiment is composed of four layers, i.e., the BPSG film 32, the plasma nitride film 3, the silicon oxide film 28 and the silicon oxide film 30, and the piezoresistive layer 29a is formed in this diaphragm. According to this embodiment, the thickness of the diaphragm can be arbitrarily set by controlling the thickness of the plasma nitride film 31.

Next, a modification of this second embodiment will be described. The aforementioned piezoresistive layer 29a in the SOI layer 29, but, if the second single crystal silicon substrate 4a is doped at its predetermined depth by oxygen ion implantation with a dose of $1 \times 10^{18}$ and is then heated, a single crystal layer can be formed over the insulating layer, which is obtained by the reaction between oxygen and silicon, and can be used to form the piezoresistive layer.

[Third Embodiment]

Figure 8A:
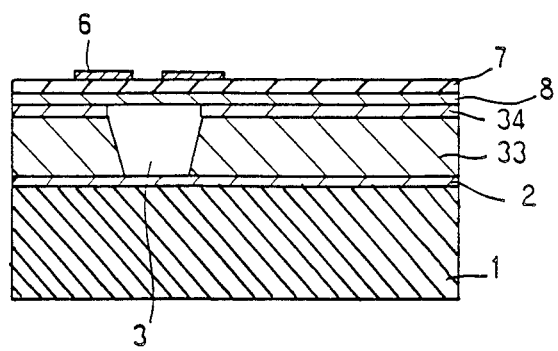
FIGS. 8(a) to 8(c) are sectional views for explaining a semiconductor pressure sensor according to a third embodiment of the present invention.
Figure 8B:
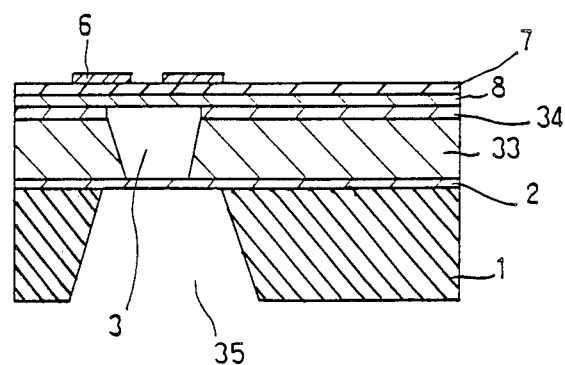
Figure 8C:
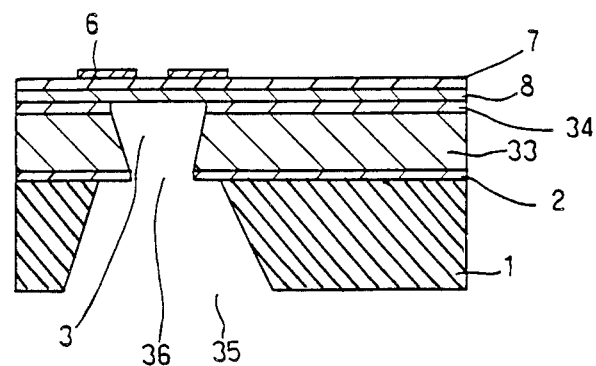

A semiconductor pressure sensor according to a third embodiment of the present invention will be described in the following with reference to FIGS. 8(a) to 8(c). The differences between the third embodiment and the first embodiment will now be explained.

Reference numeral 1 denotes the first single crystal silicon substrate. A silicon oxide film 2 is formed over the main surface of the first single crystal silicon substrate 1. A SOI layer 33 is formed by recrystallizing the polycrystalline silicon layer formed over the silicon oxide film 2. The SOI layer 33 is partially etched away up to the silicon oxide film 2 to form the recess 3 by using as a mask a silicon oxide film 34 which is formed in a predetermined region over the SOI layer 33. Like the foregoing first embodiment, moreover, the second single crystal silicon substrate is selectively etched away from the other main surface side to form the BPSG film 8, the silicon nitride film 7 and the piezoresistive layer 6 over the silicon oxide film 34 above and around the recess 3.

The structure thus made in this state can also be used as the sensor. As shown in FIG. 8(b), however, the semiconductor pressure sensor can also be used as an absolute pressure sensor if the first single crystal silicon substrate 1 is etched from its other main surface toward the recess 3 with an etchant such as KOH to form a recess 35. If a silicon oxide film 36 is removed between the recesses 3 and 35, as shown in FIG. 8(c), the pressure sensor can be a relative pressure sensor. In this embodiment, the plate is composed of the first single crystal silicon substrate 1, the silicon oxide film 2, the SOI layer 33 and the silicon oxide film 34.

[Fourth Embodiment]

Figure 9A:
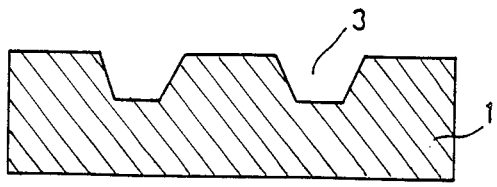
FIGS. 9(a) to 9(e) are sectional views for explaining a semiconductor pressure sensor according to a fourth embodiment of the present invention.
Figure 9B:
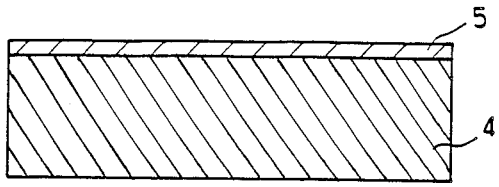
Figure 9C:
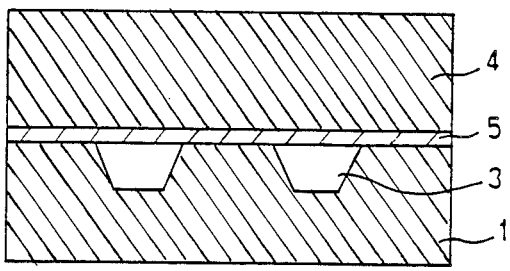
Figure 9D:
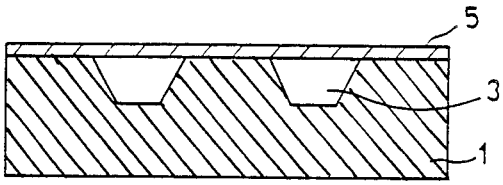
Figure 9E:
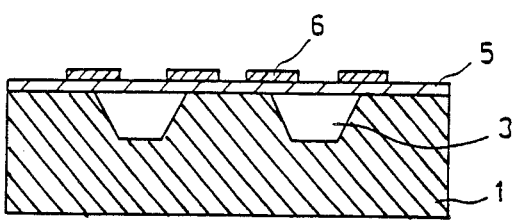

A semiconductor pressure sensor according to a fourth embodiment of the present invention will be described with reference to FIGS. 9(a) to 9(e). In FIG. 9(a), the first single crystal silicon substrate 1, which serves as the plate, is formed as in the foregoing first embodiment with the recess 3 and from which the silicon oxide film used as the mask is then removed. In FIG. 9(b), the second single crystal silicon substrate 4 is formed with the silicon oxide film 5 all over its main surface. Incidentally, it is desirable to implant movable ions such as Na or Li so that the later-described anodic bonding may be effected. As shown in FIG. 9(c), moreover, the main surface of the first single crystal silicon substrate 1 and the silicon oxide film 5 on the second single crystal silicon substrate 4 register and then are anodically bonded. As shown in FIG. 9(d), the second single crystal silicon substrate 4 is then etched away with an etchant such as KOH to leave the silicon oxide film 5 as the diaphragm on the first single crystal silicon substrate 1. After this, a shown in FIG. 9(e), the piezoresistive layer 6 of either a polycrystalline silicon layer or a recrystallized silicon layer is formed in a predetermined region over the silicon oxide film 5 by the use of the known semiconductor processing technique, thus constructing a major portion of the semiconductor pressure sensor.

[Fifth Embodiment]

Figure 10A:
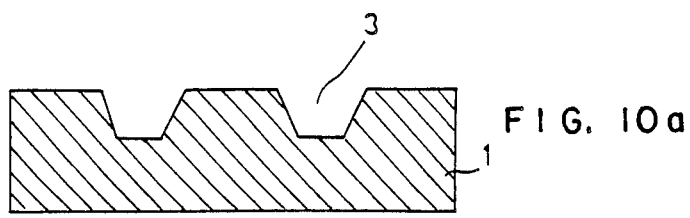
FIGS. 10(a) to 10(d) are sectional views for explaining a semiconductor pressure sensor according to a fifth embodiment of the present invention.
Figure 10B:
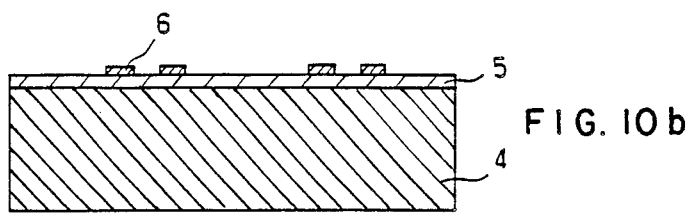
Figure 10C:
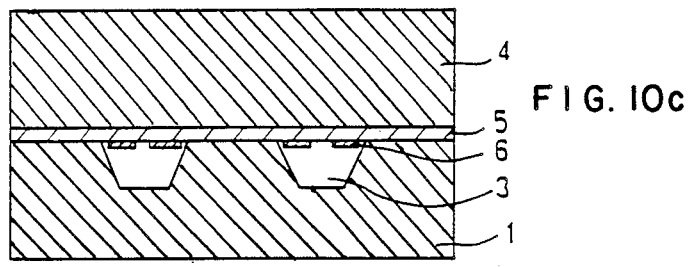
Figure 10D:
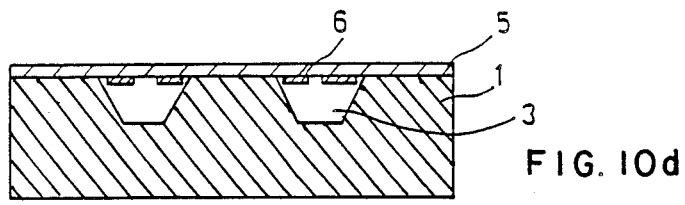

A semiconductor pressure sensor according to a fifth embodiment of the present invention will be described with reference to FIGS. 10(a) to 10(d). In FIG. 10(a), reference numeral 1 denotes the first single crystal silicon substrate like that of the foregoing fourth embodiment, and numeral 3 denotes the recess. In FIG. 10(b), reference numeral 4 denotes the second single crystal silicon substrate, and numeral 5 denotes the silicon oxide film. The difference from the fourth embodiment is that the silicon oxide film 5 in this state is formed thereover in advance with the piezoresistive layer 6 which is made of the polycrystalline silicon layer or the recrystallized silicon layer. This piezoresistive layer 6 is so arranged, as shown in FIG. 10(c), that it enters the recess 3 acting as the reference pressure chamber when the main surface of the first single crystal silicon substrate 1 and the silicon oxide film 5 are to be anodically bonded. As shown in FIG. 10(d), moreover, the second single crystal silicon substrate 4 is selectively etched away to leave the silicon oxide film 5 acting as the diaphragm, thus constructing the major portion of the semiconductor pressure sensor having no bulge on the diaphragm.

[Sixth Embodiment

Figure 11A:
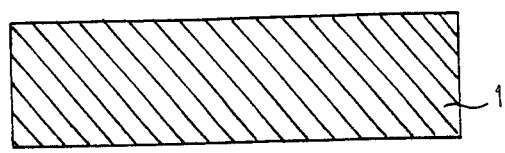
FIGS. 11(a) to 11(e) are sectional views for explaining a semiconductor pressure sensor according to a sixth embodiment of the present invention.
Figure 11B:
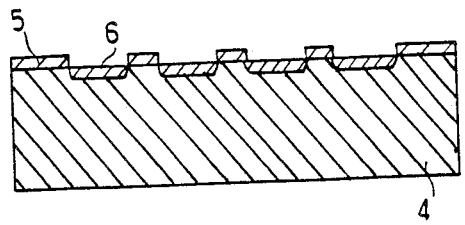
Figure 11C:
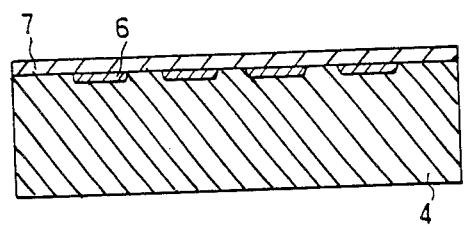
Figure 11D:
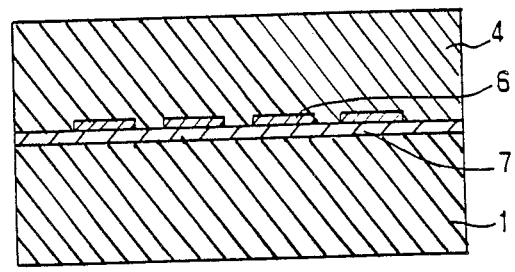

A semiconductor pressure sensor according to a sixth embodiment of the present invention will be described in the following with reference to FIGS. 11(a) to 11(e). In FIG. 11(a), reference numeral 1 denotes the first single crystal silicon substrate, in which the recess is formed at a later-described step according to the present embodiment. FIGS. 11(b) and 11(c) show forming steps similar to those described in the foregoing first embodiment with reference to FIGS. 1(c) and 1(d). Reference numeral 4 denotes the second single crystal silicon substrate; numeral 5 the silicon oxide film acting as the mask; numeral 6 the piezoresistive layer; and numeral 7 the silicon nitrite film. Incidentally, the bonding BPSG film is not formed in the present embodiment, but the silicon substrate 1 is anodically bonded in a direct fashion, as shown in FIG. 11(d).

Figure 11E:
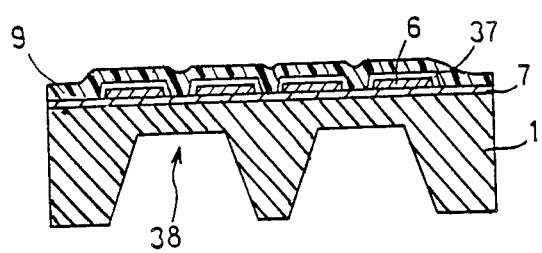

As shown in FIG. 11(e), moreover, the silicon nitride film 7 and the piezoresistive layer 6 are formed on the first single crystal silicon substrate 1 by etching away the second single crystal silicon substrate 4. After this, the piezoresistive layer 6 is thermally oxidized therearound to form a silicon oxide film 37, and the surface protecting film 9 and so on are subsequently formed over the silicon oxide film 37 and the silicon nitride film 7. Then, a portion acting as the diaphragm is formed by etching the first single crystal silicon substrate 1 from the other main surface side to form a recess 38.

[Seventh Embodiment]

Figure 12A:
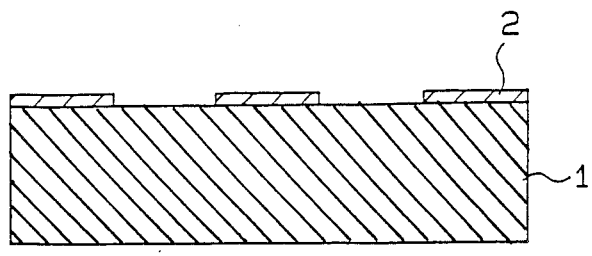
FIGS. 12(a) to 12(g) are sectional views for explaining a semiconductor pressure sensor according to a seventh embodiment of the present invention.
Figure 12B:
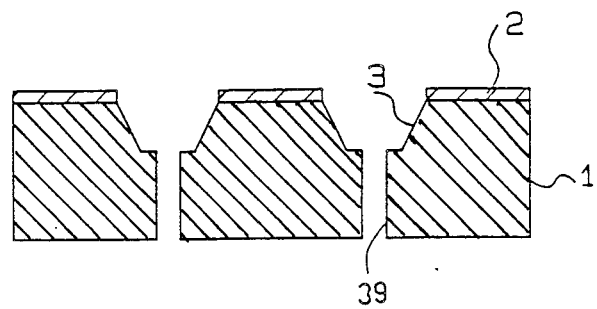

A semiconductor pressure sensor according to a seventh embodiment of the present invention will be described in the following with reference to FIGS. 12(a) to 12(g). In FIGS. 12(a) and 12(b), the first single crystal silicon substrate 1, the silicon oxide film 2 and the recess 3 are formed by a method similar to that described in the foregoing first embodiment with reference to FIGS. 1(a) and 1(b). In this seventh embodiment, moreover, the recess 3 is formed therein with a through hole 39 having a diameter of 20 to 50 μm with a laser beam. Recess 3 has a diameter of 40 to 100 μm, and the diameter of the through hole 39 is set to be smaller than that of the recess 3.

Figure 12C:
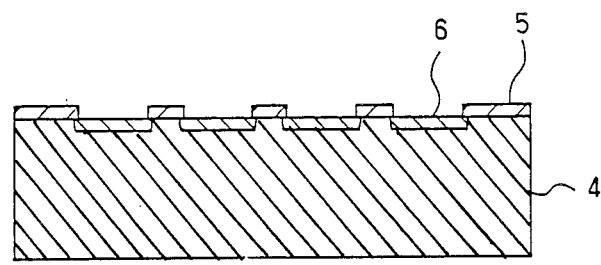
Figure 12D:
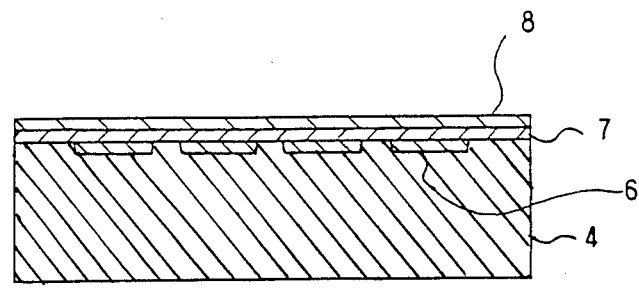
Figure 12E:
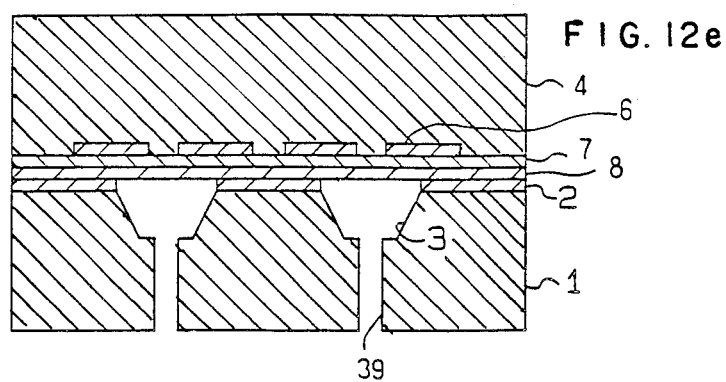
Figure 12F:
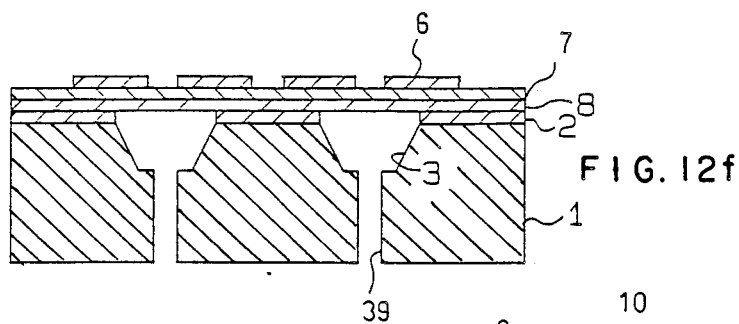
Figure 12G:
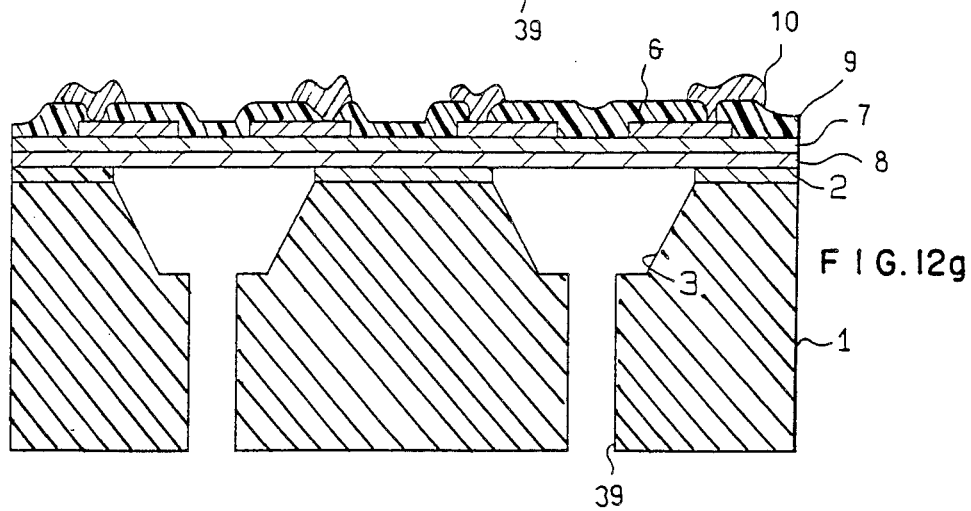

In FIGS. 12(c) and 12(d), on the other hand, the second single crystal silicon substrate 4, the silicon oxide film 5, the piezoresistive layer 6, the silicon nitride film 7 and the BPSG film 8 are formed by a method similar to that described in the foregoing first embodiment with reference to FIGS. 1(c) and 1(d). As shown in FIGS. 12(e) and 12(f), moreover, the first embodiment is followed by bonding the first and second single crystal silicon substrates 1 and 2, by selectively etching away the second single crystal silicon substrate 4 and subsequently by forming the surface protecting film 9 and the wiring layer 10, thus constructing the semiconductor pressure sensor.

Here, the relative pressure sensor of the embodiment shown in FIG. 3 has a diverging vent hole 12 because this hole 12 is formed by the etching. In this seventh embodiment, however, the through hole 39 can be linear to reduce the size of the sensor. Moreover, this seventh embodiment can be designed such that the recess 3 has a diameter of 40 to 100 μm and a depth of 10 to 40 μm, such that the diaphragm has a thickness of 1 to 5 μm, such that the through hole has a diameter of 20 to 50 μm, and such that the first single crystal silicon substrate has a thickness of 400 to 500 μm. As a result, the diaphragm portion has a sufficient vertical size, as compared with the horizontal size, to reduce the adverse influence due to the difference in the coefficient in thermal expansion so that a thermal shock absorber such as a mount which is indispensable in the prior art can be dispensed with. Consequently, this drops the production cost and the area of bonded portions so that the reliability can be improved.

Figure 13A:
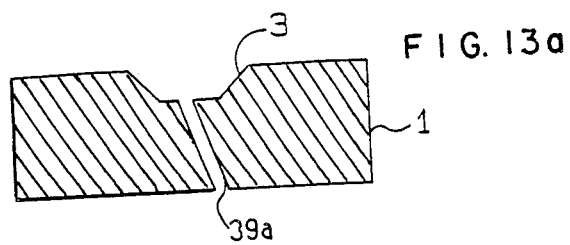
FIGS. 13(a) to 13(e) are sectional views showing a modification of a through hole in the seventh embodiment of the present invention.
Figure 13B:
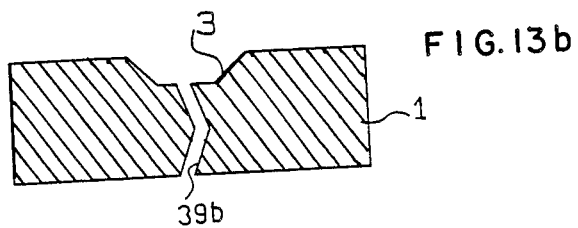
Figure 13C:
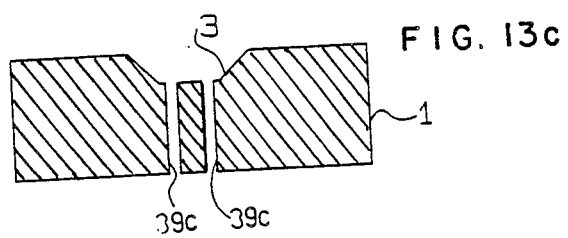

In this seventh embodiment, the through hole 39 is exemplified by one single vertical hole, but the present invention should not be limited thereto. For example, a through hole 39a may be formed in an oblique direction, as shown in FIG. 13(a), or a through hole 39b may also be formed at different angles from the upper and lower faces of the wafer, as shown in FIG. 13(b). By using slanting through holes, an abruptly fluctuating pressure and particles can be prevented from directly impinging upon the diaphragm face, even if they come into the through holes 39a and 39b. On the other hand, FIG. 13(c) shows an example in which a plurality of through holes 39c are formed. This example is highly effective for cleaning the diaphragm or for preventing the through holes 39c from getting clogged with dust or the like.

Figure 13D:
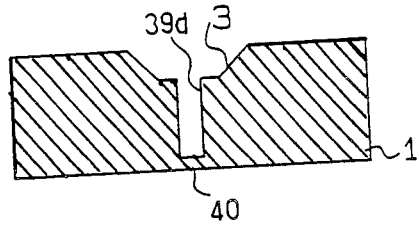
Figure 13E:
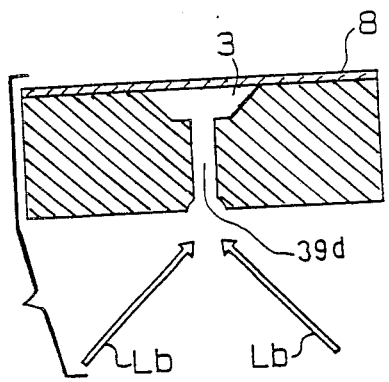

As shown in FIGS. 13(d) and 13(e), moreover, a through hole 39a is formed midway of the wafer, as shown in FIG. 13(d), to form a left portion 40. Then, the recess 3 and the through hole 39d can be kept clean without any residual of dust, impurity, cleaning liquid and so on in the course of the wafer forming step. At the final stage of the wafer forming step (i.e., after a piezoresistive, a peripheral circuit, a wiring layer, a passivation and so on have been formed, although not shown), the through hole 39d is formed obliquely from the back side by illumination of laser beams Lb. By this oblique illumination, the diaphragm has its surface kept away from being directly hit by the laser beams Lb so that it is not damaged. Incidentally, it is quite natural that the steps of FIGS. 13(a) to 13(e) can be used in combination.

Figure 14A:
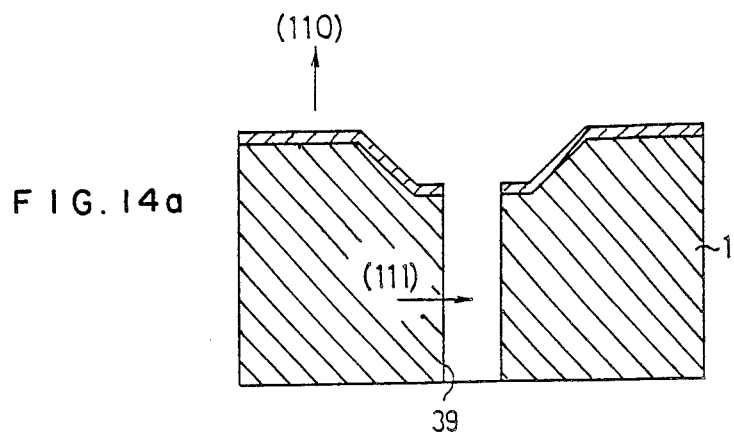
FIGS. 14(a) and 14(b) are diagrams for explaining another example of the seventh embodiment of the present invention.
Figure 14B:
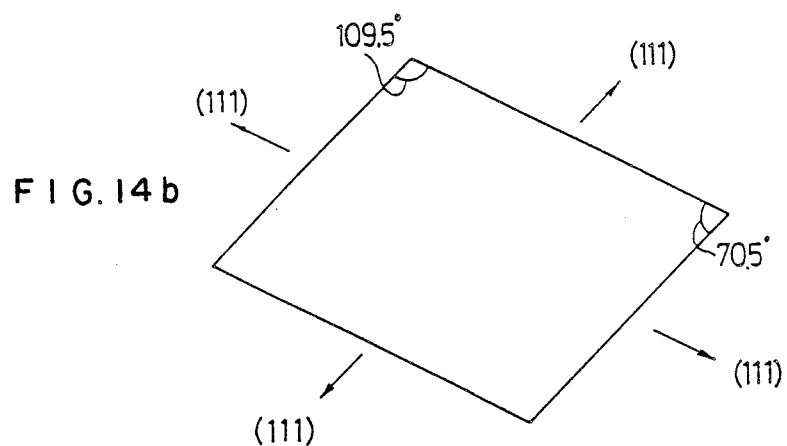

In this seventh embodiment, the through hole 39 is formed with the laser beams. As shown in FIG. 14(a), however, if the through hole pattern is formed in the orientation shown in FIG. 14(b) by the use of the silicon crystal plane (110) to effect an anisotropic etching with a solution of KOH or the like, the through hole 39 can be formed in the first single crystal silicon substrate 1, utilizing the crystal plane (111) as a side wall. By inclining the orientation of the crystal plane (110), moreover, the through hole can be formed in an oblique direction.

[Eighth Embodiment]

A semiconductor pressure sensor according to an eighth embodiment of the present invention will be described with reference to FIGS. 15(a) to 15(g). In FIGS. 15(a) and 15(b), the first single crystal silicon substrate 1, the silicon oxide film 2 and the recess 3 are formed by a method similar to that described in the foregoing first embodiment with reference to FIGS. 1(a) and 1(b).

As shown in FIG. 15(c), on the other hand, a silicon oxide film 41 is formed over the main surface of the second single crystal silicon substrate 4, and a BPSG film 42 is formed over that silicon oxide film 41. As shown in FIG. 15(d), moreover, the first and second single crystal silicon substrates 1 and 4 are bonded. Incidentally, this bonding method can likewise adopt that described in the foregoing first embodiment. In addition, however, the first and second single crystal silicon substrates 1 and 4 applied directly to each other, the silicon substrate and the silicon oxide film applied to each other with the insulating film (e.g., the silicon oxide film) at either substrate side being removed (or not formed), or the silicon oxide film 41 and the silicon oxide film 2 applied to each other not through the BPSG film 42 are heated in a furnace at 1,000° C. so that they may be bonded.

Next, as shown in FIG. 15(e), the other main surface (or back face) of the first single crystal silicon substrate 1 is covered with wax or the like (although not shown), and -the second single crystal silicon substrate 4 is etched away from its other main surface (or back face) to leave 5 to 40 μm with an anisotropic etching liquid of alkali composed mainly of potassium hydroxide (KOH), thus forming a single crystal silicon layer 43.

Here is this eighth embodiment, the second single crystal silicon substrate 4 is etched with the aforementioned alkali etchant. In this case, the etching rate is difficult to control so that the thickness of the single crystal silicon layer 7 may possibly disperse. The following techniques can be used to facilitate that control:

(1) A two-layered substrate, which is formed by the epitaxial growth of an $N^-$ lowly doped epitaxial layer (which will be referred to as the "$N^-$ epitaxial layer") having a higher specific resistance over an $N^+$ highly doped substrate (which will be referred to as the "$N^+$ substrate") having a lower specific resistance, is used in place of the second single crystal silicon substrate 4 and is electrolytically etched in hydrofluoric acid, for example. Then, the N+ substrate is etched whereas the N− epitaxial layer is little etched and left as it is. The thickness of the diaphragm is determined depending upon the thickness of the N− epitaxial layer so that the etching is automatically interrupted. By this method, moreover, the thickness of the N− epitaxial layer can be arbitrarily set together with the thickness of the diaphragm.

(2) Even with the use of the substrate in which the N-type epitaxial layer has grown over the P-type silicon substrate, the N-type epitaxial layer is not etched but left if electrolytically etched in hydrazine ($NH_2NH_2$), for example. As a result, the thickness of the diaphragm can be arbitrarily set to automatically interrupt the etching.

As shown in FIG. 15(f), a silicon oxide film 44 is selectively formed over the etched side of the second single crystal silicon substrate 4 and is used as a mask to diffuse a P-type impurity such as B (boron) with a high dose to form a piezoresistive layer 45 in the direction of <110>. After the silicon oxide film 44 has been removed, as shown in FIG. 15(g), a surface protecting film 46 and a wiring layer 47 made of aluminum are formed to construct the semiconductor pressure sensor. Incidentally, a signal processing circuit for the semiconductor pressure sensor may be constructed in the single crystal silicon layer 43 by the known semiconductor fabrication method. In the present embodiment, the diaphragm is composed of the silicon oxide film 41, the BPSG film 42 and the single crystal silicon layer 43, and the piezoresistive layer 45 is formed in this diaphragm.

[Ninth Embodiment]

A semiconductor pressure sensor according to a ninth embodiment of the present invention will be described with reference to FIGS. 16(a) to 16(g). The steps shown in FIGS. 16(a) to 16(e) are similar to those described in the foregoing first embodiment with reference to FIGS. 1(a) to 1(e), and the same components are denoted by common reference numerals so that their explanations will be omitted.

Figure 16A:
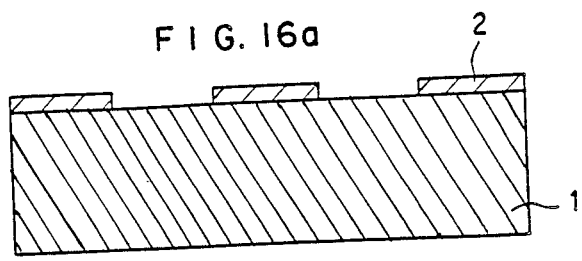
FIGS. 16(a) to 16(g) are sectional views for explaining a semiconductor pressure sensor according to a ninth embodiment of the present invention.
Figure 16B:
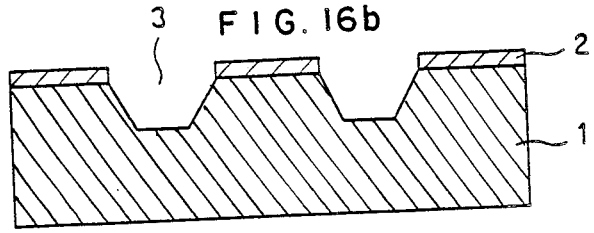
Figure 16C:
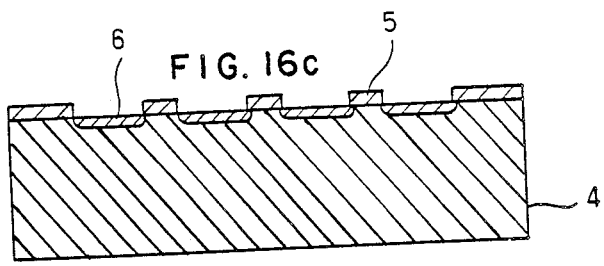
Figure 16D:
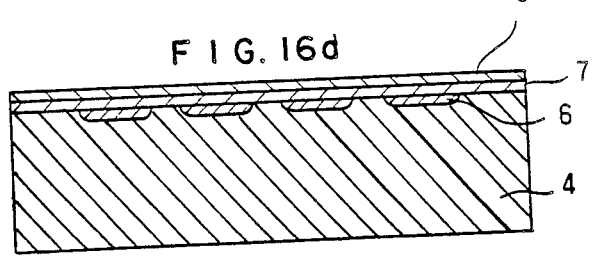
Figure 16E:
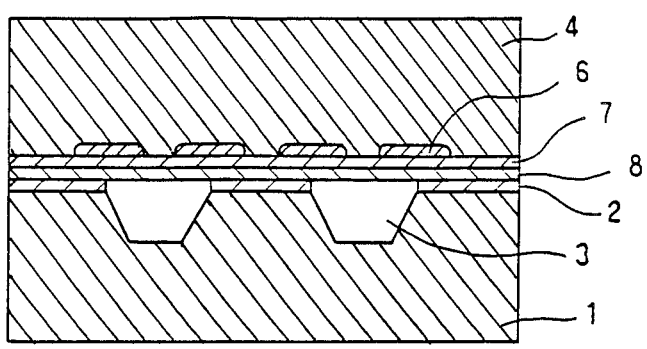
Figure 16F:
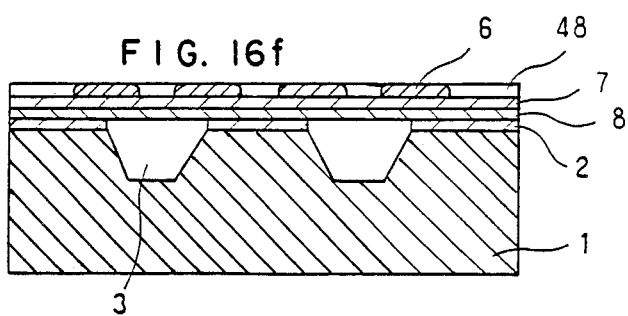
Figure 16G:
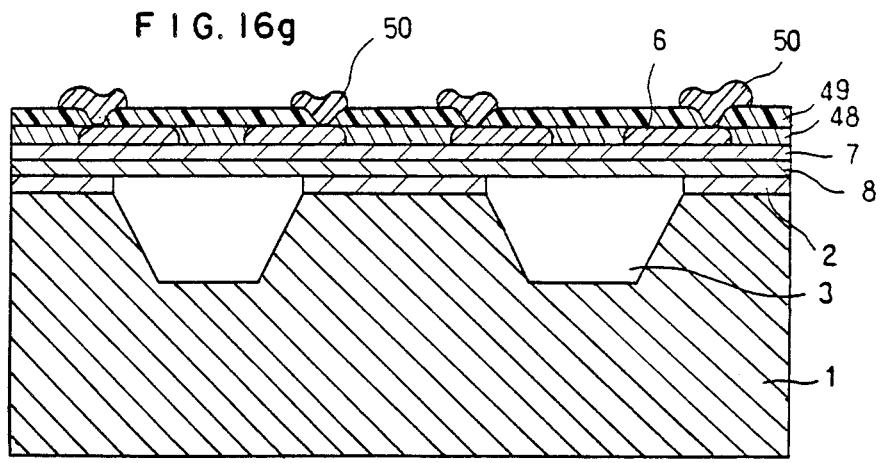

As shown in FIG. 16(f), the other main surface (or back face) of the first single crystal silicon substrate 1 is covered with wax or the like (although not shown), and the second single crystal silicon substrate 4 is etched away from its other main surface (or back face) with an anisotropic etching liquid composed mainly of potassium hydroxide (KOH). In this instance, the etching is interrupted at the instant when the piezoresistive layer 6 is exposed to the outside from the etching face. The etching method can be similar to that of the first embodiment. Thus, the single crystal piezoresistive layer 6 and a single crystal silicon layer 48 are formed over the silicon nitride film 7 providing an insulating film acting as the diaphragm. As shown in FIG. 16(g), a surface protecting film 49 and a wiring layer 50 made of aluminum or the like are formed to construct the semiconductor pressure sensor. In this embodiment, the diaphragm is composed of the silicon nitride film 7, the BPSG film 8 and the single crystal silicon layer 48, and the piezoresistive layer 6 is formed in this diaphragm.

[Tenth Embodiment]

Figure 17F:
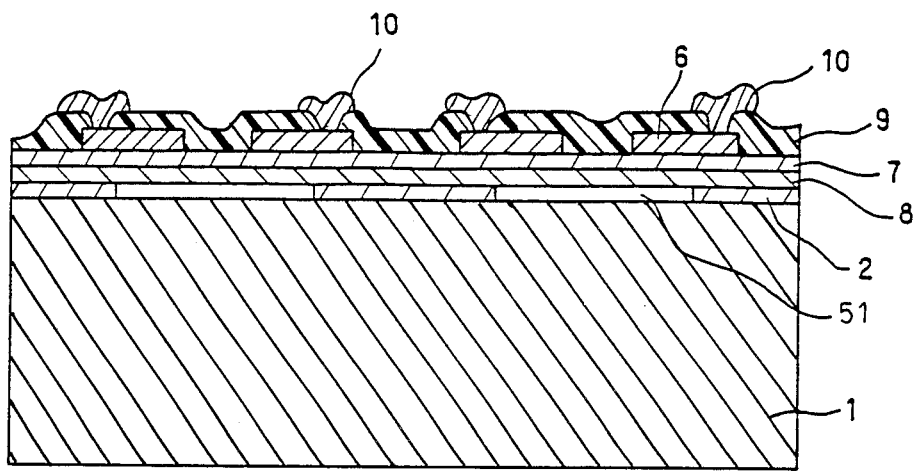

A semiconductor pressure sensor according to a tenth embodiment of the present invention will be described with reference to FIGS. 17(a) to 17(f). In FIG. 17(a), the silicon oxide film 2 is formed over the first single crystal silicon substrate 1 by the CVD or thermally oxidizing method. Then, this silicon oxide film 2 has its predetermined region etched away by the photolithography and etching technique to form an aperture 2a as the recess. Incidentally, a silicon nitride film or polycrystalline silicon may be used in addition to the silicon oxide film.

As shown in FIGS. 17(b) and 17(c), on the other hand, the piezoresistive layer 6, the silicon nitride film 7 and the BPSG film 8 are sequentially formed over the second single crystal silicon substrate 4. As shown in FIG. 17(d), moreover, the BPSG film 8 formed over the second single crystal silicon substrate 4 is so arranged by registration using an infrared microscope, for example, that the upper and lower patterns register, as preset, over the main surface of the first single crystal silicon substrate 1, namely, that the piezoresistive layer 6 is arranged to register with the opening 2a. Then, the first and second single crystal silicon substrates 1 and 4 are bonded to form a reference pressure chamber 51.

As shown in FIG. 17(e), moreover, the second single crystal silicon substrate 4 is selectively etched from its other main surface (or back face) with the E.P.W. liquid, for example, to form the single crystal piezoresistive layer 6 over the silicon nitride film 7 and BPSG film 8 acting as the diaphragm. As shown in FIG. 17(f), still moreover, the surface protecting film 9 and the wiring layer 10 made of aluminum or the like are formed to construct the semiconductor pressure sensor.

If, in this tenth embodiment, the thickness of the silicon oxide film 2 is controlled to a predetermined value, the diaphragm comes into contact with the main surface of the first single crystal silicon substrate 1, even if the pressure to be measured is excessive, so that the excessive displacement can be avoided to prevent itself from being broken. The plate is composed of the first single crystal silicon substrate 1 and the silicon oxide film 2.

[Eleventh Embodiment]

Figure 18A:
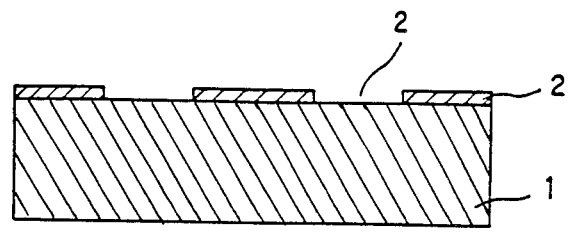
FIGS. 18(a) to 18(d) are sectional views for explaining a semiconductor pressure sensor according to an eleventh embodiment of the present invention.

A semiconductor pressure sensor according to a Eleventh embodiment of the present invention will be described with reference to FIGS. 18(a) to 18(d). Here, components similar to those of the foregoing tenth embodiment are denoted with common reference numerals. First of all, as shown in FIG. 18(a), the silicon oxide film 2 having the aperture 2a in the main surface of the first single crystal silicon substrate 1 is formed during a step similar to that described in the tenth embodiment with reference to FIG. 17(a).

Figure 18B:
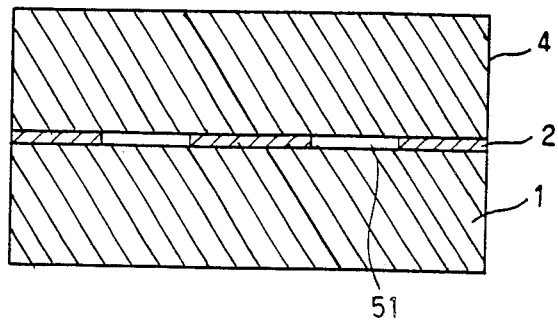

As shown in FIG. 18(b), the maim surface of the first single crystal silicon substrate 1 and the main surface of the second single crystal silicon substrate 4 are overlaid, as preset, through the silicon oxide film 2 and put into a vacuum furnace at about 1,000° C. so that the silicon oxide film 2 and the second single crystal silicon substrate 4 are directly bonded.

Figure 18C:
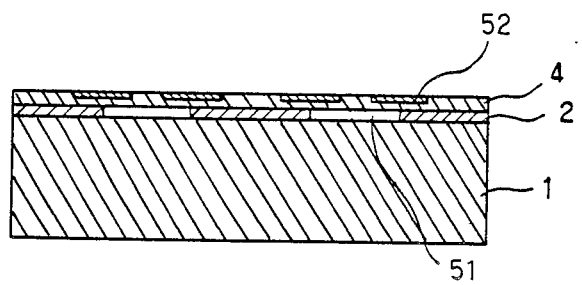
Figure 18D:
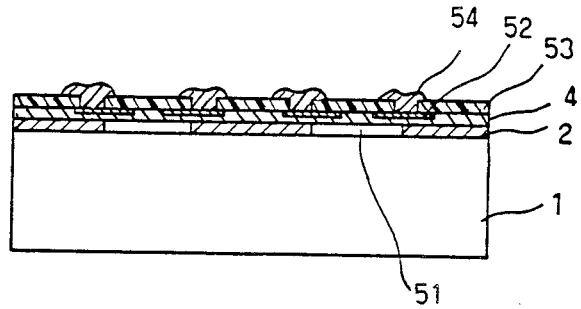

As shown in FIG. 18(c), the second single crystal silicon substrate 4 is etched from its main surface with an etching liquid such as potassium hydroxide (KOH) to leave its portion as the diaphragm having a predetermined thickness. Subsequently, that region of the second single crystal silicon substrate 4, which corresponds to the reference pressure chamber 51, is highly doped with a P-type impurity such as boron (B) by the ion implantation (or diffusion) to form a piezoresistive layer 52. As shown in FIG. 18(d), moreover, a surface protecting film 53 and a wiring layer 54 made of aluminum or the like are formed to construct the semiconductor pressure sensor.

According to this eleventh embodiment, the piezoresistive layer 52 is formed after the two substrates 1 and 4 have been bonded. After the piezoresistive layer 52 has been formed in the second single crystal silicon substrate 4, as in the foregoing tenth embodiment, the bonding may be accomplished, followed by etching the second single crystal silicon substrate 4. If, in this case, the etching is performed far as the surface of the piezoresistive layer 52 is completely exposed, the PN junction area can be reduced to drop the leak current.

[Twelfth Embodiment]

Figure 19A:
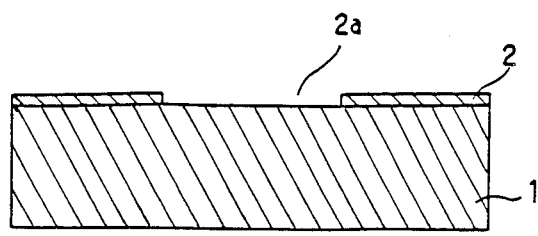
FIGS. 19(a) to 19(d) are sectional views for explaining a semiconductor pressure sensor according to a twelfth embodiment of the present invention.

A semiconductor pressure sensor according to a Twelfth embodiment of the present invention will be described with reference to FIGS. 19(a) to 19(e). Here, the components similar to those of the foregoing tenth embodiment are denoted by common reference numerals. First of all, as shown in FIG. 19(a), the silicon oxide film 2 having the aperture 2a as the recess is formed over the main surface of the first single crystal silicon substrate 1 at the step similar to that described in the tenth embodiment with reference to FIG. 17(a).

Figure 19B:
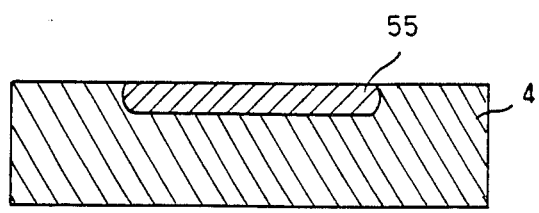

As shown in FIG. 19(b), moreover, the second single crystal silicon substrate 4 is highly doped from its main surface with a P-type impurity such as boron (B) by the ion implantation (or diffusion) to form a piezoresistive layer 55. Piezoresistive layer 55 is formed to have a larger area than that of the aperture 2a.

Figure 19C:
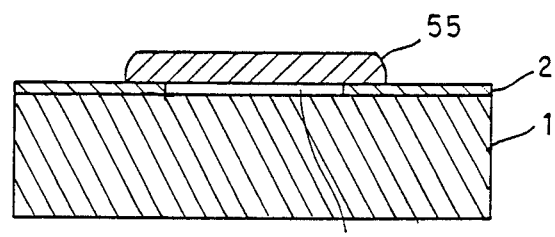
Figure 19D:
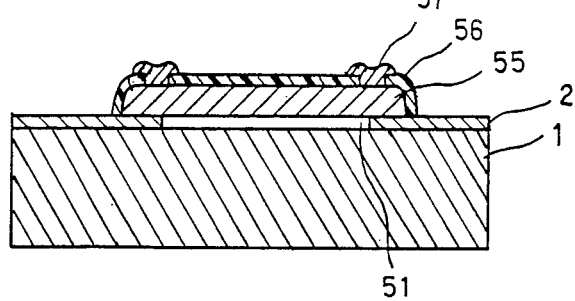
Figure 20:
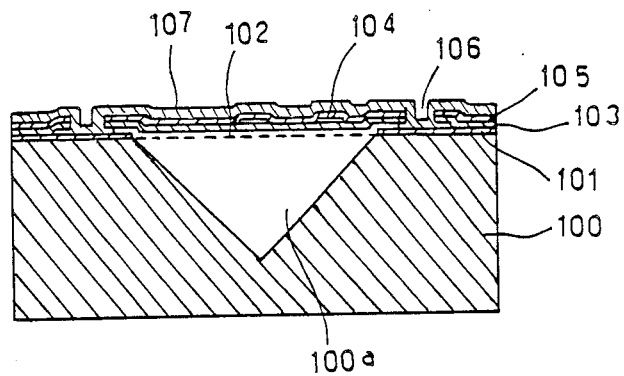
FIG. 20 is a sectional view showing the semiconductor pressure sensor according to the prior art.

Then, the main surface of the first single crystal silicon substrate 1 and the main surface of the second single crystal silicon substrate 4 are bonded through the silicon oxide film 2. The second single crystal silicon substrate 4 is etched from its main surface with an etching liquid similar to that of the foregoing tenth embodiment. As shown in FIG. 19(c), the piezoresistive layer 55 is so arranged as to cover the aperture 2a thereby to form the reference pressure chamber 51, so that the piezoresistive layer 55 acts as a diaphragm. As shown in FIG. 19(d), moreover, a surface protecting film 56 and a wiring layer 57 made of aluminum or the like are formed to construct the semiconductor pressure sensor. The semiconductor pressure sensor of the present embodiment is formed with wiring layers 57a, 57b, 57c, and 57d in four positions of the piezoresistive layer 55, as shown in FIG. 19(e). The pressure to be measured can be detected by applying a voltage between the wiring layers 57a and 57c and by observing the voltage between with wiring layers 57b and 57d.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A method of fabricating a semiconductor pressure sensor, comprising the steps of:
   (a) forming a recess in a first main surface of a first substrate;
   (b) forming a through-hole extending from a second main surface other than said first main surface of the first substrate to the recess formed in the first main surface, wherein the step of forming a through-hole comprises a first portion removing step of forming a hole partway through said first substrate to form a partial hole with a first portion remaining, and a second portion removing step of removing said first portion at a final stage of a wafer forming step to form the through-hole;
   (c) doping with an impurity from a main surface of a second semiconductor substrate to form a piezoresistive layer in a predetermined region of the second substrate;
   (d) forming a diaphragm layer on the main surface of the second substrate;
   (e) bonding the first main surface of the first substrate with the diaphragm layer of the second substrate so that the piezoresistive layer is positioned at least partially over the recess; and
   (f) etching away a portion of the second substrate to leave at least the diaphragm layer to act as a diaphragm of the sensor, along with the piezoresistive layer.

2. A method according to claim 1, wherein the step of forming a diaphragm layer comprises the step of forming an insulating layer.

3. A method according to claim 1, wherein in the step of etching away a portion of the second substrate comprises the step of etching away a portion of the second substrate to leave only the diaphragm layer to act as a diaphragm, along with the piezoresistive layer.

4. A method according to claim 1, wherein the step of forming a through-hole comprises the step of forming a through-hole which has a diameter smaller than that of the recess.

5. A method according to claim 4, wherein the step of forming a recess comprises the step of forming a recess having a diameter in a range of from 40 to 100 μm and a depth in a range of from 10 to 40 μm in a first substrate having a thickness in a range of from 400 to 500 μm, wherein the step of forming a through-hole comprises the step of forming a through hole having a diameter in the range of from 20 to 50 μm, and wherein the step of forming a diaphragm layer comprises the step of forming a diaphragm layer having a thickness in a range of from 1 to 5 μm.

6. A method according to claim 1, wherein the step of forming a through-hole comprises the step of forming a through-hole in a direction oblique to the second main surface.

7. A method according to claim 1, wherein the step of forming a through-hole comprises the step of forming a through-hole at different angles from said first and second main surfaces of said first substrate.

8. A method according to claim 1, further comprising the steps of forming a plurality of through-holes other than said through-hole.

9. A method according to claim 1, wherein the step of forming a through-hole comprises the steps of forming a hole midway through said first substrate to form a first portion and removing said first portion at a final stage of a wafer forming step to form the through-hole.

10. A method according to claim 1, wherein the step of forming a through-hole by removing said left portion includes the step of forming a through-hole using oblique illumination by a laser beam.

11. A method according to claim 1, wherein the step of forming a through-hole further comprises the step of forming a through-hole with a laser beam.

12. A method according to claim 1, wherein the step of forming a through-hole comprises the step of forming a through-hole with an anisotropic etching.

13. A method of fabricating a semiconductor pressure sensor, comprising the steps of:
   (a) forming a recess in a first main surface of a first substrate;
   (b) forming a through-hole extending from a second main surface of the first substrate to the recess, wherein the step of forming a through-hole comprises a first portion removing step of forming a hole partway through said first substrate to form a partial hole with a first portion remaining, and a second portion removing step of removing said first portion at a final stage of a wafer forming step to form the through-hole;
   (c) doping a second substrate of a semiconductor material with an impurity to form a piezoresistive layer in a predetermined region of the second substrate;
   (d) forming a diaphragm layer on a main surface of the substrate of the semiconductor;
   (e) bonding the first main surface of the first substrate to the diaphragm layer, so that the piezoresistive layer is positioned at least partially over the recess; and
   (f) etching away at least a portion of the second substrate to leave at least the diaphragm layer to act as a diaphragm of the sensor, to leave the piezoresistive layer on the diaphragm layer.

14. A method of fabricating a semiconductor pressure sensor, comprising the steps of:
   (a) forming a recess in a first main surface of a first substrate;
   (b) forming a through-hole extending from a second main surface of the first substrate to the recess, said through-hole having a smaller diameter than said recess, wherein the step of forming a through-hole comprises a first portion removing step of forming a hole partway through said first substrate to form a partial hole with a first portion remaining, and a second portion removing step of removing said first portion at a final stage of a wafer forming step to form the through-hole;
   (c) doping a second substrate of a semiconductor material with an impurity from a main surface of the second substrate of the semiconductor, to form a piezoresistive layer in a predetermined region of the second substrate;
   (d) forming a diaphragm layer on the main surface of the second substrate;
   (e) bonding the first main surface of the first substrate to the diaphragm layer formed on the main surface of the second substrate, so that the piezoresistive element is positioned at least partially over the recess; and
   (f) etching away a portion of the second substrate to leave at least the diaphragm layer to act as a diaphragm of the sensor, along with the piezoresistive layer.

* * * * *